C. W. GAMWELL.
RAIL CONSTRUCTION.
APPLICATION FILED DEC. 26, 1911.

1,042,545.

Patented Oct. 29, 1912.

3 SHEETS—SHEET 1.

Witnesses
C. E. Kumpf,
R. B. Cavanagh.

Inventor
Charles W. Gamwell
By Victor J. Evans
Attorney

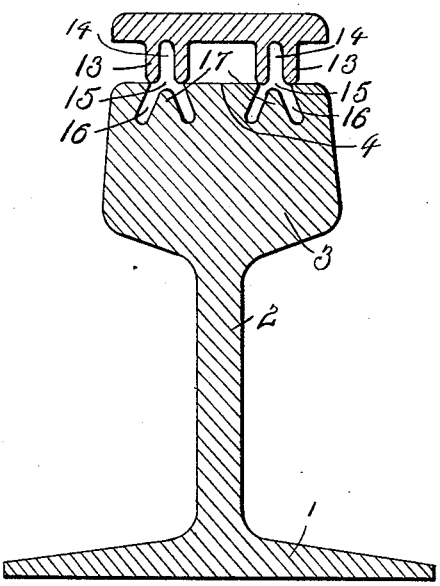
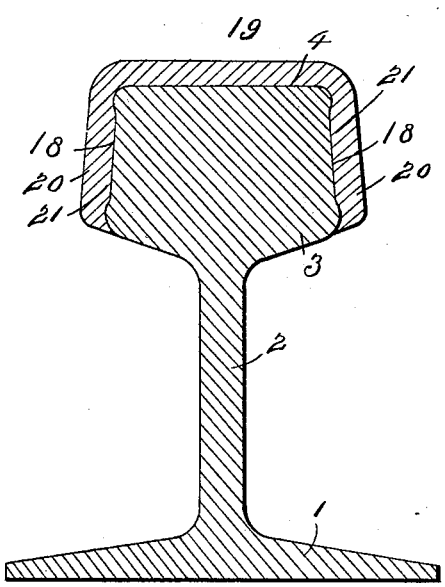
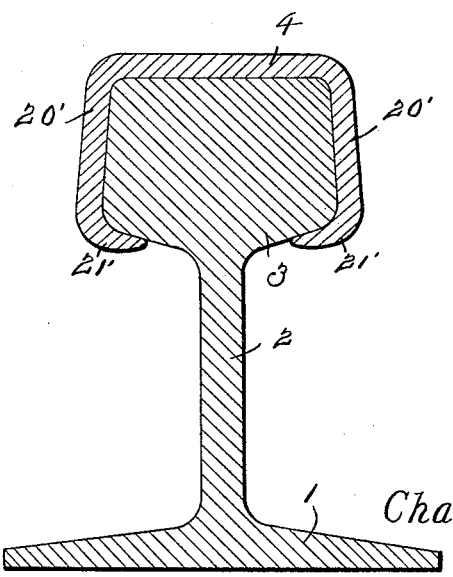

C. W. GAMWELL.
RAIL CONSTRUCTION.
APPLICATION FILED DEC. 26, 1911.

1,042,545.

Patented Oct. 29, 1912.

3 SHEETS—SHEET 3.

Witnesses
C. E. Kemper.
R. B. Cavanagh.

Inventor
Charles W. Gamwell

By Victor J. Evans
Attorney

UNITED STATES PATENT OFFICE.

CHARLES W. GAMWELL, OF RALEIGH, NORTH CAROLINA.

RAIL CONSTRUCTION.

1,042,545. Specification of Letters Patent. Patented Oct. 29, 1912.

Application filed December 26, 1911. Serial No. 667,744.

*To all whom it may concern:*

Be it known that I, CHARLES W. GAM-WELL, a citizen of the United States, residing at Raleigh, in the county of Wake and State of North Carolina, have invented new and useful Improvements in Rail Construction, of which the following is a specification.

The present invention relates to the manufacture of rails, and has particular application to rails adapted to be employed in the construction of trackways, or other rails which are subjected to wear by rolling stock or other bodies traveling over the same.

In the present instance, I have for the sake of illustration, shown my invention as employed in connection with a railway rail, but I wish it to be understood that it is not limited in its useful application to this particular use.

In carrying out my invention, it is my purpose to provide a rail head or tread surface which is adapted to be applied to the head or tread of a rail which has been worn by the continuous travel of the rolling stock thereover, or, if desired, the rail itself in the course of manufacture may have the longitudinal tread applied thereto in accordance with the invention.

A further object of my invention is to provide a separate tread section which may be quickly, readily and securely attached to the rail body, without welding, brazing or the employment of numerous bolts, nuts and other fastening devices.

With the above-recited objects and others of a similar nature in view, the invention consists in the construction, combination and arrangement of parts, set forth in and falling within the scope of the appended claims.

Figure 1:
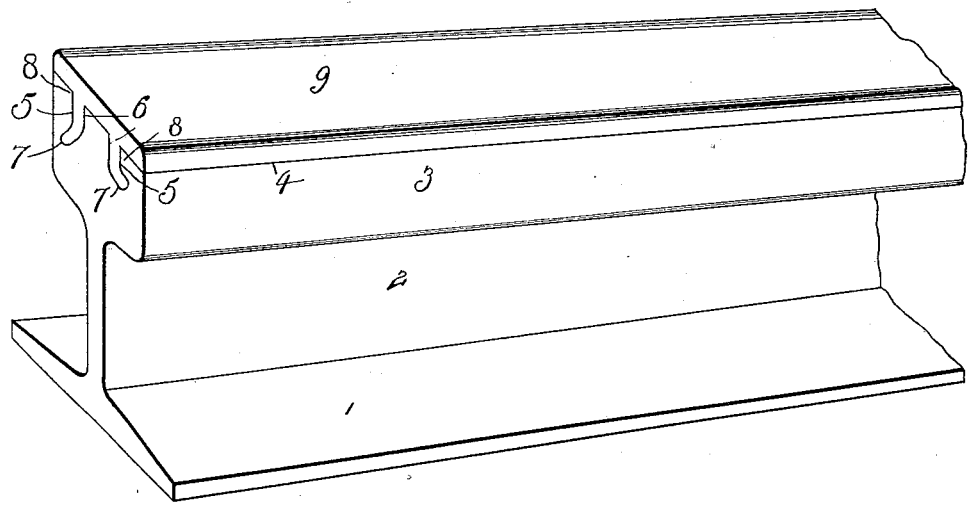
Figure 2:
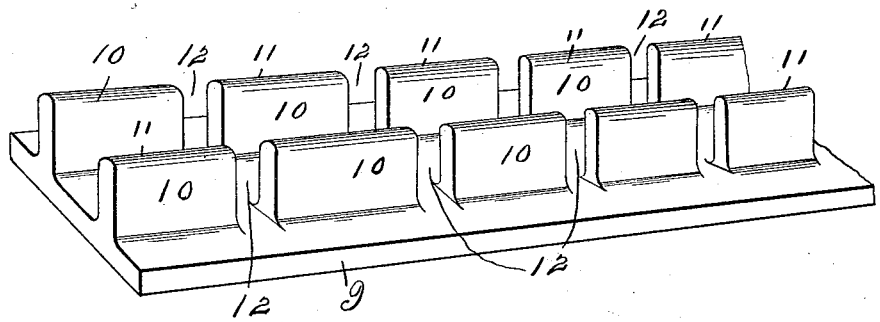
Figure 1:
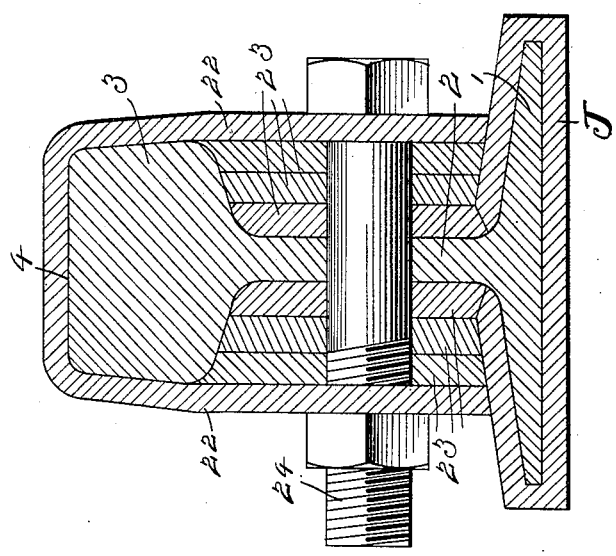
Figure 6:
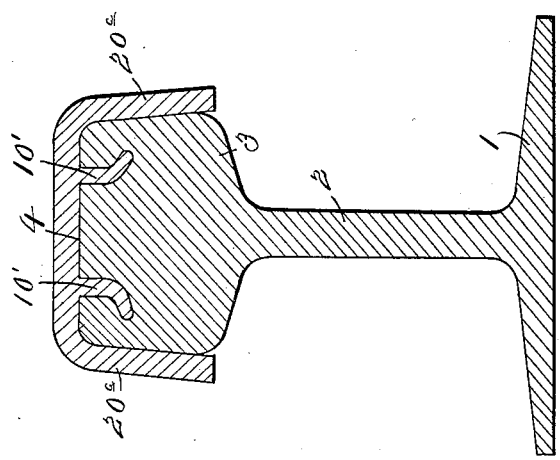

In the drawing:—Figure 1 is a perspective view of a section of the rail provided with one form of my invention. Fig. 2 is a similar but inverted view of the separate or detached tread section, showing the attaching ribs formed on the under surface thereof. Fig. 3 is a cross sectional view of a modified form. Fig. 4 is a cross sectional view of a further modification. Fig. 5 is another modified form, showing the tread section provided with depending sides adapted to have the lower edges thereof turned in beneath the head of the rail. Fig. 6 is a cross sectional view of a further modification. Fig. 7 is another further modification, showing the invention as applied to a railway rail joint.

Referring now to the accompanying drawing in detail, the numeral 1 designates the base of an old rail while 2 is the web thereof and 3 the ball or head having the tread surface 4. Referring now particularly to Figs. 1 and 2, it is my purpose in the practice of my invention, when the tread surface of an old rail has been worn in use, or when making a new rail, to cut or form by rolling during the process of manufacture in the head of the rail at the tread section one or more angular grooves 5, the entrance portion 6 of the groove being formed either vertically in the head, as shown in the illustration, while the end of the groove 7 extends at an angle to the entrance thereof, or diagonally, the whole groove being extended at an angle to the entrance thereof.

In Fig. 1 I have shown two outwardly turned longitudinally extending angular grooves, which form a pair of shoulders or locking flanges 8 in the head of the rail. The separate ball section which is to be applied to the head is indicated by the numeral 9 and has formed on the under surface thereof one or more depending attaching ribs 10 which are rounded or tapered as at 11 at the lower edge thereof. I have also employed in Figs. 1 and 2, two of these attaching ribs which extend longitudinally of the bottom of the section 9 and are spaced apart a sufficient distance to aline with the proper grooves in the head of the rail. Referring to Fig. 2, it will be seen that these longitudinally extending ribs may be formed with cut away or cut out portions 12 so that each rib is really made up of a series of short sections. In attaching the tread surface 9 to the head of the rail, the tongues which extend vertically downward are seated in the grooves and pressure is then exerted by clamping, pounding or in any other manner forcing the ribs down in the grooves so that they are forced or turned into the angular part of the groove, thereby interlocking with the same, as shown in Fig. 1. By such an arrangement, it will be observed that the new tread section is firmly and securely connected to the rail.

In Fig. 3, I have shown a slightly modified form of my invention, in this case the longitudinal locking ribs 13 being split or bifurcated as at 14, while the groove 15 formed in the rail is provided with diverging slots 16 leaving a rib 17 therebetween adapted to lie in the bifurcated portion 14 of the attaching ribs, the latter being spread by the rib 17 which is triangular in cross section.

In Fig. 4, I form a continuous groove or indentation longitudinally of the sides of the rail head as at 18 and provide the separate tread section 19 with depending sides 20 having longitudinally extending enlargements or ribs 21 formed on the inner sides thereof adapted to interlock with the grooves 18 when the separate tread member is applied to the rail.

In Fig. 5, the tread section is provided with depending side members 20' terminating in reduced or lower beveled portions 21' which are adapted when the tread section is applied to be bent inward to meet the bottom of the rail head.

Fig. 6 shows another modification, wherein the tread section is provided with depending locking ribs 10' similar to the ribs 10 in Figs. 1 and 2, while the tread section is provided with depending sides 20ª.

In Fig. 7, I have shown an arrangement wherein the invention is applicable to the joint at the meeting ends of railway rails, which, as is well-known, are subjected to considerable wear and stress or pounding. In the structure shown in this figure, the rail is provided with a rail joint chair J while the separate tread section is formed with depending sides 22—22 which extend down alongside the rail and form a part of the rail joint, the space between the sides 22—22 and the web of the rail having a suitable filling 23 of steel plates or the like, while 24 indicates a bolt passing through the rail web and through the sides 22—22 of the attaching tread section.

While I have herein shown and described the further embodiments of my invention, I wish it to be understood that I do not limit myself to all the precise details of construction herein set forth by way of illustration, as modification and variation may be made without departing from the spirit of the invention or exceeding the scope of the appended claims.

I claim:—

1. The combination with a rail having an angular groove formed in the head thereof, of a separate tread section provided with a rib adapted to be forced into the groove and bent into interlocking engagement with the same during the application of the tread section to the rail.

2. A rail having the head thereof formed with a plurality of longitudinally extending angular grooves, the separate tread sections adapted to be attached to the head of the rail, said tread sections having longitudinally extending ribs adapted to be inserted in the grooves when the head section is applied to the tread section of the rail, said ribs being bent at an angle by pressure to force the same into interlocking engagement with the grooves.

In testimony whereof I affix my signature in presence of two witnesses.

CHARLES W. GAMWELL.

Witnesses:
W. T. O'DONOHUE,
D. G. MEBANE.

---

Copies of this patent may be obtained for five cents each, by addressing the "Commissioner of Patents, Washington, D. C."